015# United States Patent [19]

Tsujimura et al.

[11] Patent Number: 5,028,494

[45] Date of Patent: Jul. 2, 1991

[54] BRAKE DISK MATERIAL FOR RAILROAD VEHICLE

[75] Inventors: Taro Tsujimura, Shibuya; Shuji Manabe, Kokubunji; Akira Watanabe; Yoshihiro Sugai, both of Susono, all of Japan

[73] Assignees: Railway Technical Research Institute; MItsubishi Aluminum Kabushiki Kaisha, Tokyo, Japan

[21] Appl. No.: 378,620

[22] Filed: Jul. 12, 1989

[30] Foreign Application Priority Data

Jul. 15, 1988 [JP] Japan .................................. 63-176697

[51] Int. Cl.$^5$ ............................................. C22C 32/00
[52] U.S. Cl. .................................................... 428/614
[58] Field of Search ......................................... 428/614

[56] References Cited

U.S. PATENT DOCUMENTS

| 4,661,154 | 4/1987 | Faure | 419/64 |
| 4,713,111 | 12/1987 | Cameron et al. | 428/614 |
| 4,753,690 | 6/1988 | Wada et al. | 428/614 |
| 4,759,995 | 7/1988 | Skibo et al. | 428/614 |

FOREIGN PATENT DOCUMENTS

| 2744725 | 8/1979 | Fed. Rep. of Germany . |
| 56-75545 | 6/1981 | Japan . |
| 56-116851 | 9/1981 | Japan . |
| 57-82440 | 5/1982 | Japan . |
| 57-82441 | 5/1982 | Japan . |
| 58-81948 | 5/1983 | Japan . |
| 58-117849 | 7/1983 | Japan . |
| 59-173234 | 1/1984 | Japan . |
| 60-50138 | 3/1985 | Japan . |
| 61-48556 | 3/1986 | Japan . |
| 61-159545 | 7/1986 | Japan . |
| 61-257450 | 11/1986 | Japan . |
| 62-70538 | 4/1987 | Japan . |
| 62-124244 | 5/1987 | Japan . |
| 62-227057 | 10/1987 | Japan . |
| 63-169340 | 7/1988 | Japan . |
| 2112813 | 7/1983 | United Kingdom . |
| 2172825 | 10/1986 | United Kingdom . |

OTHER PUBLICATIONS

Chemical Abstracts #102(8): 661035 for Japanese Patent "Kokai", 59-173234.

*Primary Examiner*—R. Dean
*Assistant Examiner*—David W. Schumaker
*Attorney, Agent, or Firm*—Wenderoth, Lind & Ponack

[57] ABSTRACT

An aluminum composite material as a brake disk material for railroad vehicles is obtained by dispersing and mixing reinforcement particles of alumina, silicon carbide or the like into an aluminum alloy. The reinforcement particles are 5 to 100 μm in diameter, and are dispersed uniformly in the alloy in an amount of 1 to 25% by weight. An extremely excellent brake disk material for railroad vehicles is thus provided which is light in weight and has high strength, good thermal conductivity and high wear resistance.

5 Claims, 8 Drawing Sheets

FIG. 1(A)

AVERAGE COEFFICIENT
OF FRICTION vs.
FRICTION SPEED

FIG. 1(B)

AVERAGE COEFFICIENT
OF FRICTION vs.
FRICTION SPEED

FIG. 1(C)

AVERAGE COEFFICIENT OF FRICTION vs. FRICTION SPEED

FIG. 1(D)

AVERAGE COEFFICIENT OF FRICTION vs. FRICTION SPEED

FIG. 2(A)

RATE OF WEAR OF DISK vs. FRICTION SPEED

FIG. 2(B)

RATE OF WEAR OF DISK vs. FRICTION SPEED

FIG. 2(C) RATE OF WEAR OF DISK vs. FRICTION SPEED

FIG. 2(D) RATE OF WEAR OF DISK vs. FRICTION SPEED

FIG. 3(A)

RATE OF WEAR OF LINING vs. FRICTION SPEED

FIG. 3(B)

RATE OF WEAR OF LINING vs. FRICTION SPEED

FIG. 3(C)

RATE OF WEAR OF LINING vs. FRICTION SPEED

FIG. 3(D)

RATE OF WEAR OF LINING vs. FRICTION SPEED

FIG. 4

AVERAGE COEFFICIENT OF
FRICTION
VS.
FRICTION SPEED

FIG. 5

RATE OF WEAR OF DISK
VS.
FRICTION SPEED

FIG. 6

RATE OF WEAR OF LINING
VS.
FRICTION SPEED

BRAKE DISK MATERIAL FOR RAILROAD VEHICLE

BACKGROUND OF THE INVENTION

1. Field of the Invention

This invention relates to a brake disk material for railroad vehicles which is used as a material for brake disks for use in high-speed railroad vehicles.

2. Description of the Prior Art

As a brake disk material adopted for disk brake systems in railroad vehicles having a maximum service velocity of around 100 km/h, there has hitherto been used a pearlitic-matrix flaky graphite cast iron which, according to Japanese National Railway Standard (hereinafter referred to JRS) 12209-1, has a tensile strength of at least 274 MPa and a hardness of 183 to 269 HB. As a brake disk material adopted for high-speed railroad vehicles with a maximum velocity reaching 220 km/h, on the other hand, there has been used a low-alloyed pearlitic-matrix flaky graphite cast iron (Ni: 1.0 to 2.0% by weight, Cr: 0.3 to 0.6% by weight, Mo: 0.3 to 0.5% by weight, hereinafter referred to as "NCM cast iron") which, according to JRS 12209-2, has a tensile strength of at least 245 MPa and a hardness of 210 to 280 HB.

The brake disk material constituted of the NCM cast iron is characterized by an appropriate average coefficient of friction, a stable instantaneous coefficient of friction and a low rate of wear, which ensure a braking force fulfilling the specifications both at the time of service braking for stop (initial speed braking: 35 km/h) and at the time of emergency braking for stop (initial speed braking: 220 km/h). The brake disk material of the NCM cast iron is thus superior to general-purpose pearlitic-matrix flaky graphite cast irons in resistance to heat cracking at the sliding surfaces of brake disks, even under high-frequency (service braking) or high-load (emergency braking) frictional conditions.

The NCM cast iron is obtained through increases in the size and number of graphite particles formed in the structure of the metal to serve for absorption and relaxation of thermal stress, with the attendant reduction in strength being compensated for by reinforcement of the matrix structure through alloying with Ni, Cr and Mo. Comparable to JIS FC25 grade cast irons in strength, the NCM cast iron has good thermal conductivity and excellent resistance to mechanical damage caused by heat loads.

Recently, a maximum velocity of 240 km/h has been realized with railroad vehicles, and a still higher velocity is being sought. Under such existing conditions, the brake disk materials conventionally used have been confronted by new problems. Namely, in case of a high-load braking with the brake disk material in such high-speed vehicles in an emergency, the heat crack resistance of the sliding surfaces, even if formed of the NCM cast iron, may be unsatisfactory.

In view of the above, it has been contemplated to prevent the generation of heat cracks by using a material of further higher strength and toughness, and a forged steel brake disk material has recently been developed and put to practical use. However, the original reason for the use of cast iron in place of steel as a brake disk material is the stable friction-wear characteristics of the cast iron during braking, due to the presence of free carbon (graphite) in the cast iron. Therefore, the forged steel brake disk material has the problems of instability in coefficient of friction during braking and a greater permanent set of the material in use, as compared to the cast iron brake disk material.

With the increasingly higher velocity recently intended for railroad vehicles as mentioned above, the brake disk materials for use in such railroad vehicles are required to have a good balance of friction-wear characteristics, material strength and thermal damage resistance. Furthermore, in order to meet the requirement for smaller non-suspended weight on a design basis, development of a nonferrous brake disk material of high performance has been desired. A typical example of lightweight nonferrous metals is aluminum alloy. When a conventional aluminum alloy is used as a brake disk material for railroad vehicles, however, the material does not show satisfactory friction-wear characteristics or the like in such application, and leads to large disk wear as well as seizure or the like, by which the pad material as a mating material is also consumed.

SUMMARY OF THE INVENTION

It is accordingly an object of this invention to provide a brake disk material for railroad vehicles which is light in weight and has high strength, good thermal conductivity and high wear resistance.

According to this invention, there is provided a brake disk material for railroad vehicles which comprises, dispersed in an aluminum metal matrix, 1 to 25% by weight of reinforcement particles having a diameter of 5 to 100 μm.

As the aluminum metal constituting the matrix, not only pure aluminum but also various aluminum alloys can be used, among which a desirable one is an Al-Mg alloy showing little reduction in strength due to frictional heat.

The reinforcement particles dispersed in the aluminum metal matrix may be particles of, for example, $Al_2O_3$, SiC or mica, provided that the particles are hard fine particles. The diameter of the reinforcement particles is 5 to 100 μm. If the particle diameter is less than 5 μm, satisfactory wear resistance for use as a brake disk material is not obtainable. A particle diameter of more than 100 μm, on the other hand, leads to lower machinability and toughness.

If the amount of the reinforcement particles dispersed is less than 1% by weight, satisfactory wear resistance for use as a brake disk material is, again, not obtainable. If the amount of the particles exceeds 25% by weight, the machinability and toughness are lowered.

It is desirable that the reinforcement particles are dispersed uniformly in the aluminum metal matrix, but, if desired, the particles may be present locally at specified portions.

The superiority or inferiority of friction-wear characteristics of a brake disk material for high-speed vehicles is evaluated based on the propriety of average coefficient of friction in braking, the stability of instantaneous coefficient of friction and the wear resistance of the brake disk and the mating material. Though aluminum alloys are generally deemed low in resistance to wear, it is possible to provide an aluminum alloy with an extremely high wear resistance by adding and dispersing hard reinforcement particles uniformly in the aluminum matrix. Besides, a brake disk material is required to have sufficient strength for security under the centrifugal force generated by the high-speed rotation of the brake disk and the thermal stress generated by the heat load at the time of braking, and the reinforcement particle dispersion type aluminum alloy is superior to the NCM cast iron in strength and thermal conductivity. Namely, the reinforcement particle dispersion type aluminum alloy as a brake disk material is superior also in resistance to heat cracking at the sliding surface of the brake disk under high-frequency (service braking) or high-load (emergency braking) frictional conditions. Moreover, the specific gravity of the aluminum alloy, 2.7, is as low as about one-third of the specific gravity of cast iron, 7.2–7.3; thus, by use of the aluminum alloy it is possible to markedly improve the lightness in weight, which is essential to the high-speed vehicles, on a material basis.

The limit of the braking force of a railroad vehicle depends on the frictional force (adhesion force) between the wheel and the rail. When the braking force exceeds the adhesion force between the wheel and the rail, the wheel slips on the rail without rotating; therefore, the wheel tread is ground by the rail, and the resultant flaw increases the vibration of the wheel set, rendering the ride comfort extremely poor. Thus, the upper limit of the braking force is restricted by the adhesion force. In the case of a railroad vehicle, the adhesion force is determined by the friction between the metal of the wheel and the metal of the rail and, therefore, is by far lower than that in the case of an automobile using rubber tires. Accordingly, brakes for railroad vehicles should be lower in the pressure with which the lining is pressed against the brake disk, be longer in the period of time necessary for stopping, have a relatively lower coefficient of friction of 0.25 to 0.3, and be superior in stability of the coefficient of friction from a higher to a lower speed, as compared with brake for automobiles.

An addition of more than 1% by weight of ceramic particles to the above-mentioned aluminum metal matrix makes it possible to obtain an extremely high wear resistance and to obtain an appropriate coefficient of friction, thereby rendering the resultant material suitable for use as a brake disk material. However, when the vehicle speed is raised to about 300 km/h, where a lining having a property of strongly attacking the brake disk is used, where the vehicle weight is large and the vehicle has a high inertia force, or where the area ratio of the lining material to the disk is high, the surface temperature of the disk material is raised to a temperature near the melting point of aluminum, resulting in an increased possibility of seizure of the disk material and the lining to each other. The seizure, if brought about, would cause scattering of particles of the disk material adhered to the lining or would cause an increase in the coefficient of friction, thereby lowering the performance of the brake material. Dispersing the ceramic particles in the aluminum metal matrix enhances the seizure resistance and, therefore, reduces the possibility of the above-mentioned phenomena, the effect of the dispersion being higher as the amount of the ceramic particles dispersed is greater.

From the viewpoint of the practical production of brake disk members, however, it is considered that the larger the amount of the ceramic particles dispersed, the poorer the castability, forgeability, machinability or other secondary workability and toughness of the disk material. Therefore, it is preferable to add the ceramic particles in an amount of 1 to 7% by weight when the vehicle speed is low (less than 220 km/h), where the lining used is weak in the property of attacking the disk or where the inertial mass of the vehicle is small. When the vehicle speed is high (220 km/h or above), where the lining used is strong in the property of attacking the disk, or where the inertial mass of the vehicle is large, on the other hand, it is preferable to increase further the amount of the ceramic particles dispersed, because there is a high possibility of seizure due to a rise in the disk temperature. The upper limit of the amount of the particles dispersed is restricted by the secondary workability or toughness, as mentioned above. It is possible to ensure favorable secondary workability by appropriate selection of the working conditions or cutting tools, and to ensure good toughness by an improvement in construction, such as embracing the disk by the wheel. An addition of more than 25% by weight of ceramic particles, however, makes it difficult to obtain the desired result by modifying the working conditions or the construction, and makes it impossible to adopt the resultant material as a brake disk material.

The amount of the dispersed ceramic particles which is desirable for the case of high vehicle speeds (220 to 250 km/h), without considerable lowering in secondary workability or toughness, is from 7 to 15% by weight.

With the ferrous materials conventionally used as a brake disk material, it is difficult to obtain a performance comparable or superior to the performance displayed by the brake disk material according to this invention.

As has been described above, according to this invention, reinforcement particles 5 to 100 $\mu$m in diameter are dispersed in an aluminum metal matrix in an amount of 1 to 25% by weight. It has been confirmed that the particle dispersion type aluminum alloy thus obtained is lighter in weight and has higher strength, superior thermal conductivity and extremely higher wear resistance as well as substantially comparable friction-wear characteristics, as compared with the conventional NCM cast iron. Accordingly, the brake disk material according to the invention has effective properties for use as a brake disk material for high-speed vehicles.

The above and other objects, features and advantages of this invention will become apparent from the following description and appended claims, taken in conjunction with the accompanying drawings which show by way of example some preferred embodiments of the invention.

BRIEF DESCRIPTION OF THE DRAWINGS

FIGS. 1 (A) through 3 (D) show the results of constant-speed friction tests on the materials according to the embodiments of this invention and on some prior-art materials, wherein FIGS. 1 (A) to 1 (D) show the relationship between friction speed and average coefficient of friction;

FIGS. 2 (A) to 2 (D) show the relationship between friction speed and rate of wear of disk;

FIGS. 3 (A) to 3 (D) show the relationship between friction speed and rate of wear of lining; and FIGS. 4 to 6 show the results of constant-speed friction tests, at increased levels of friction speed, on the material according to one embodiment of the invention in which reinforcement particles are added in an amount of 5% by weight, wherein

DESCRIPTION OF THE PREFERRED EMBODIMENTS

The preferred embodiments of this invention will now be described below.

Reinforcement particles of $Al_2O_3$ or SiC were dispersed and mixed into a matrix of the 5083 aluminum alloy (JIS H4000) by a composite casting process, to obtain aluminum composite materials. The diameter of the $Al_2O_3$ particles was about 20 μm, and the diameter of the SiC particles was about 10 to 30 μm. Some of the composite materials contained 3% or 5% by weight of either $Al_2O_3$ or SiC particles dispersed therein, and the other contained 2.5% by weight each of both the $Al_2O_3$ particles and the SiC particles dispersed therein. The composite materials were subjected to constant-speed friction tests to verify the friction-wear characteristics of the materials as a brake disk material for high-speed vehicles.

More specifically, the composite materials, as materials to be tested, were formed into disk-shaped test pieces 206 mm in diameter and 25 mm in thickness (hereinafter referred to as "disks"). On the other hand, as mating materials for friction, two kinds of copper-base sintered alloy linings respectively for the NCM cast iron (the lining will be hereinafter referred to as "Cu1") and for forged steel (the lining will be hereinafter referred to as "Cu2") and one kind of lining for ordinary cast iron (the lining will be hereinafter referred to as "FC1") were prepared. The lining materials were provided with a friction surface area of 30×30 mm.

The test conditions were as follows. The friction speed was set at three levels: 7, 14 and 21 m/s. The pressing force for the lining was 0.5 MPa, and the continuous friction time for one run was 60 seconds. The test at each friction speed was repeated 25 times.

The items of measurement were average coefficient of friction, instantaneous coefficient of friction, rates of wear of the disk and the linking, and temperatures rises in the disk and the lining.

Further, for comparison of the friction-wear characteristics of the disks of the materials according to the embodiment of the invention with those of the disks of prior-art materials, disks of the NCM cast iron (prior art material) were also subjected to the constant-speed friction tests under the same conditions as for the disks according to the embodiment.

Besides, the materials under test with which good results were obtained in the tests up to 21 m/s (friction speed) were formed into disks 565 mm in diameter and 30 mm in thickness, and the disks were subjected to constant-speed friction tests in the same manner as above, with the friction speed set at five levels: 14, 28, 42, 56 and 70 m/s.

As a result of the tests it was found that the materials according to the embodiment and the NCM cast iron were comparable to each other in instantaneous coefficient of friction. As to the temperature rises in the disk and the lining, the disks according to the embodiment were superior to (namely, showed smaller temperature rises than) the disks of the prior art material.

Next, FIGS. 1 (A) to 3 (D) show the results of measurement of average coefficient of friction, rate of wear of disk and rate of wear of lining, respectively, upon the constant-speed friction tests, with friction speeds of up to 21 m/s, on the disks according to the embodiment and the disks of the prior art material.

First, a general view of the average coefficient of friction at each friction speed will be taken (FIGS. 1 (A) to 1 (D)).

The disks according to the embodiment showed an average coefficient of friction substantially comparable to that of the NCM cast iron when the mating material was the copper-base sintered alloy lining (Cu1 or Cu2). When the mating material was the lining for ordinary cast iron (FC1), the disks according to the embodiment with addition of 3% by weight of the reinforcement particles showed a greater decrease in coefficient of friction with an increase in friction speed, as compared to the disks of the NCM cast iron.

Next, a general view will be taken of the rates of wear of disk and lining (FIGS. 1 (B) and 1 (C)). At some friction speeds, the weight of the disk according to the embodiment was increased after the test (namely, the disk after the test was heavier than at the beginning at some friction speed) when the mating material was the copper-base sintered alloy lining. Therefore, the disk according to the embodiment showed higher wear resistance than that of NCM cast iron, when the mating material was the copper-base sintered alloy lining. The rate of wear of disk according to the embodiment, when the mating material was ordinary cast iron lining, was comparable to that of NCM cast iron, although the hardness of the base material of the embodiment is low.

Figure 1A:
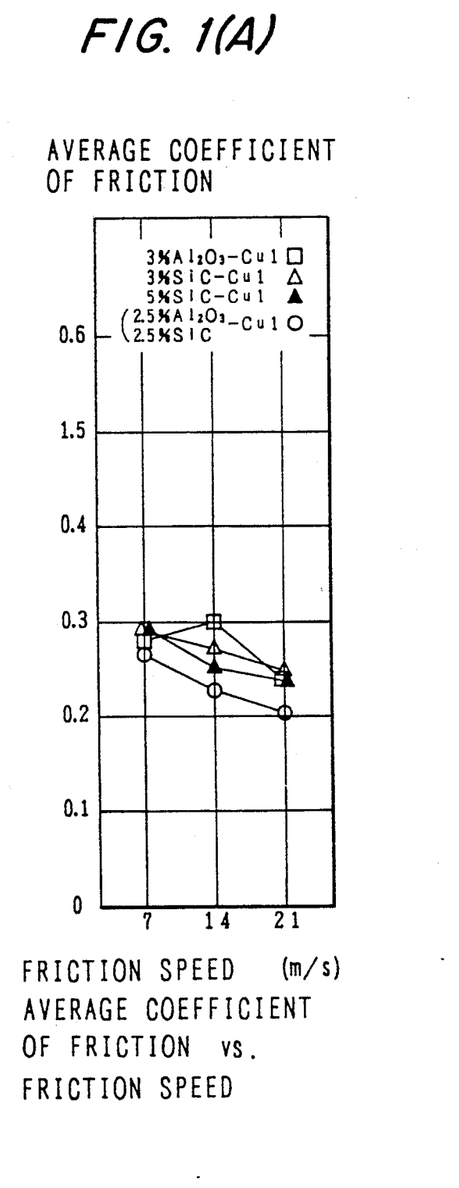
Figure 1B:
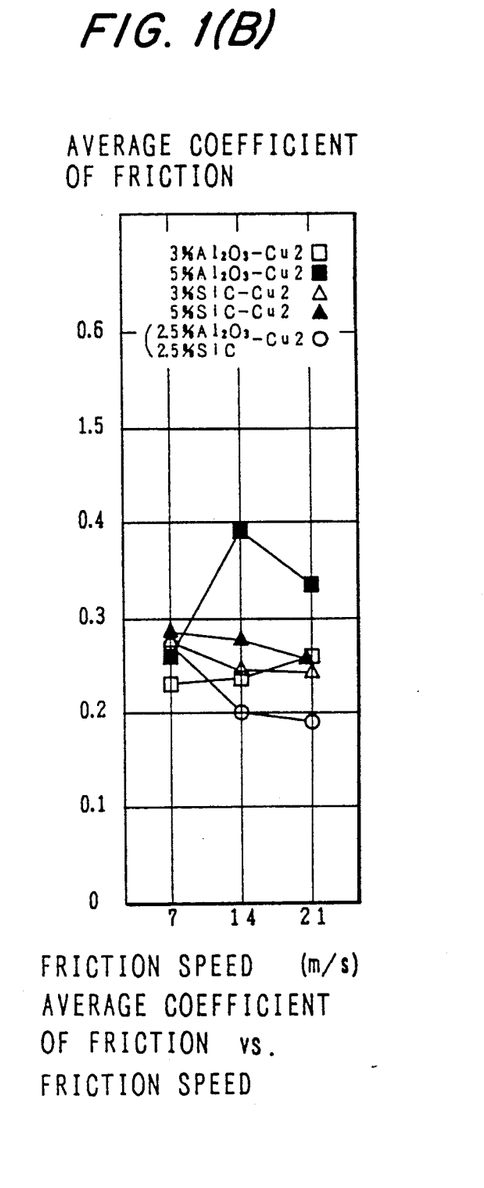
Figure 1C:
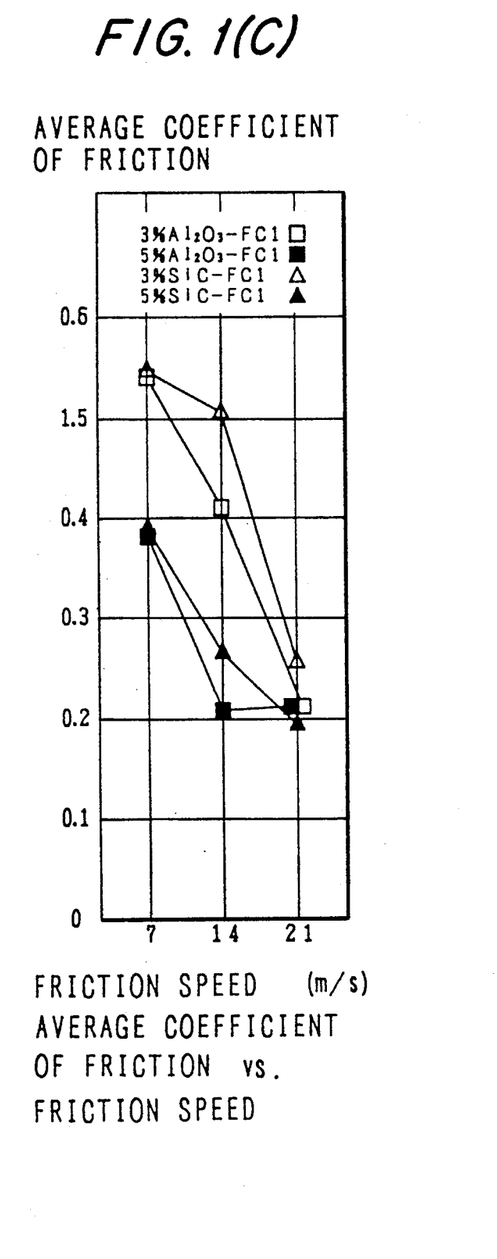
Figure 1D:
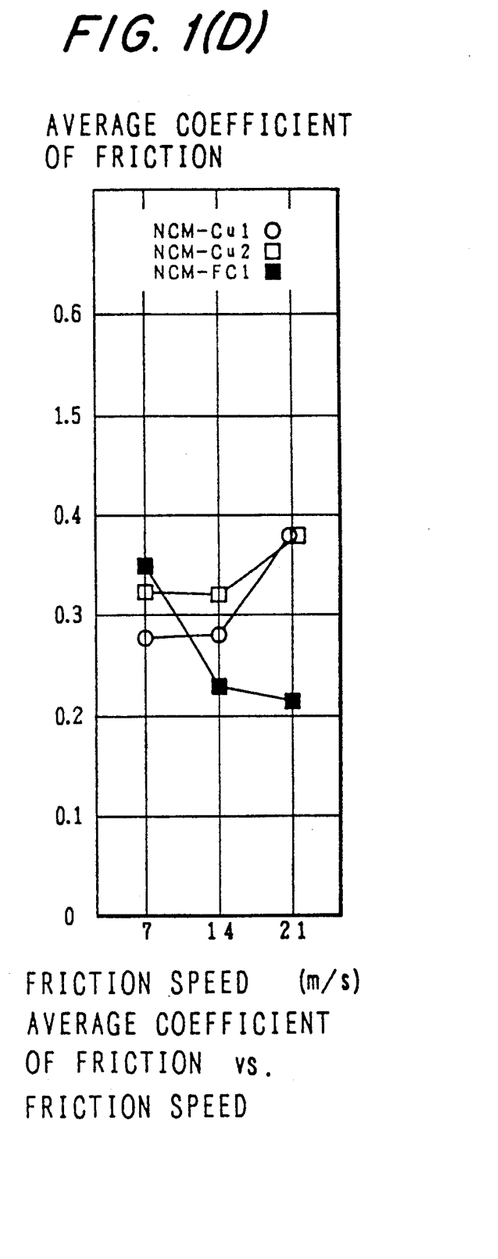
Figure 2A:
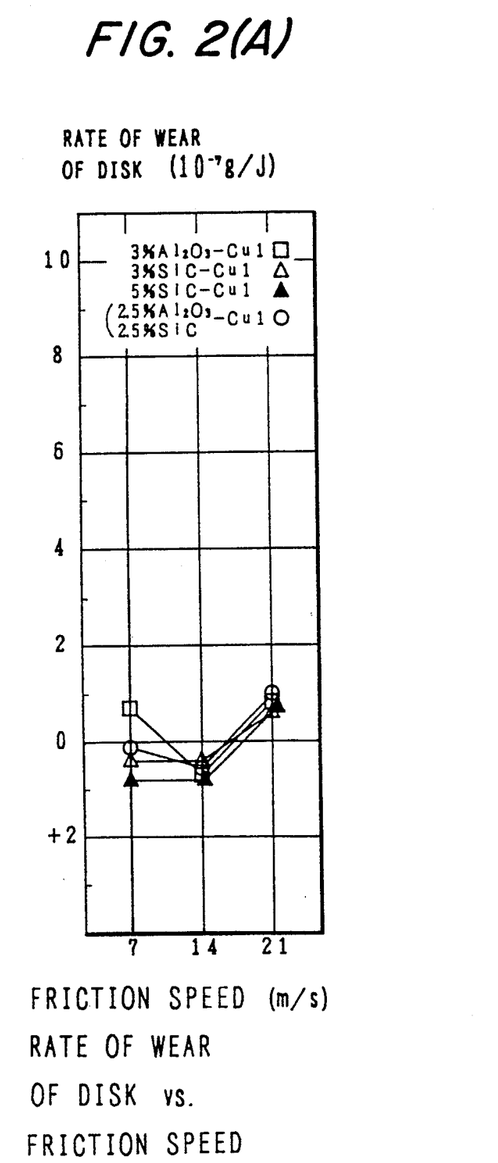
Figure 2B:
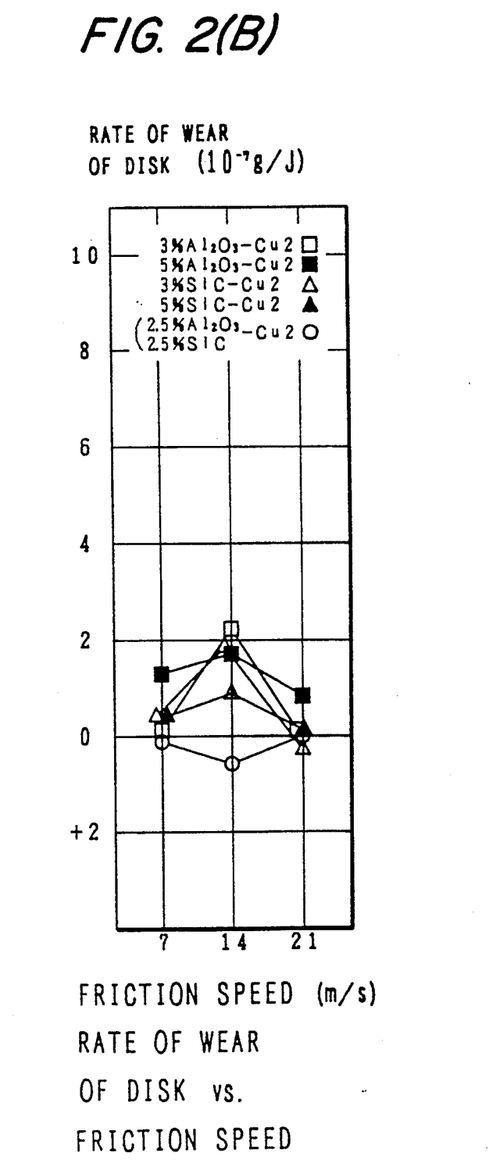
Figure 2C:
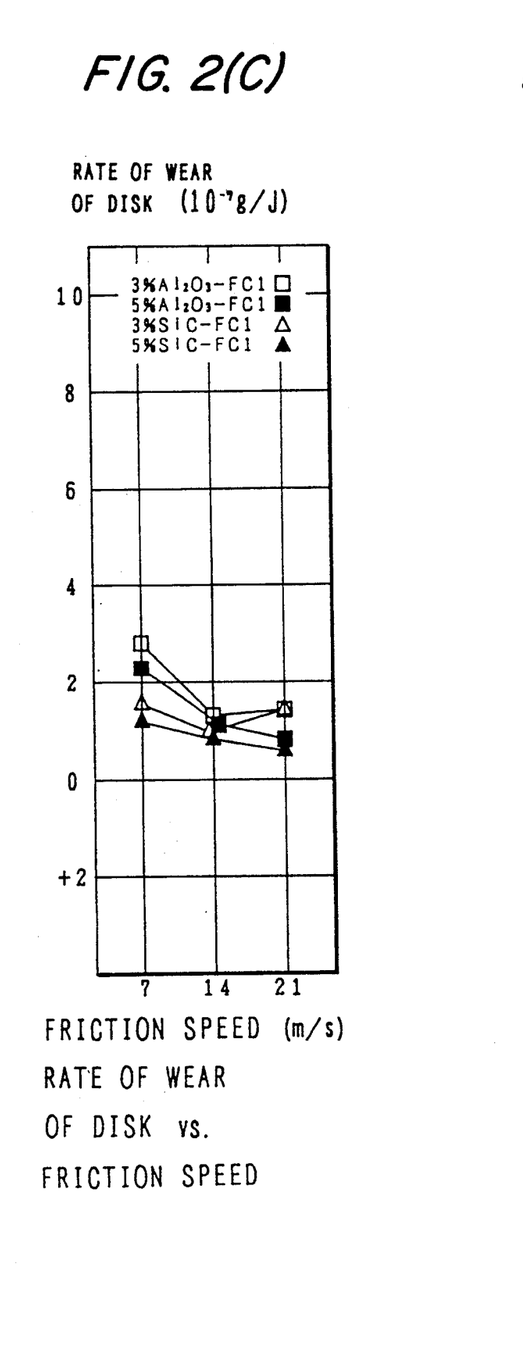
Figure 2D:
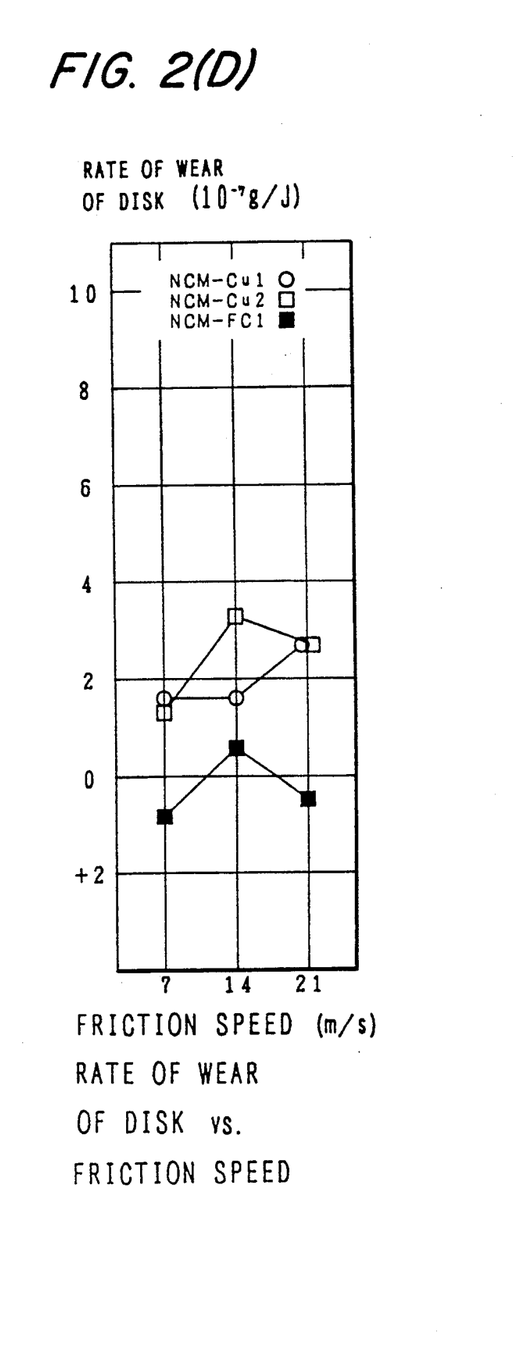
Figure 3A:
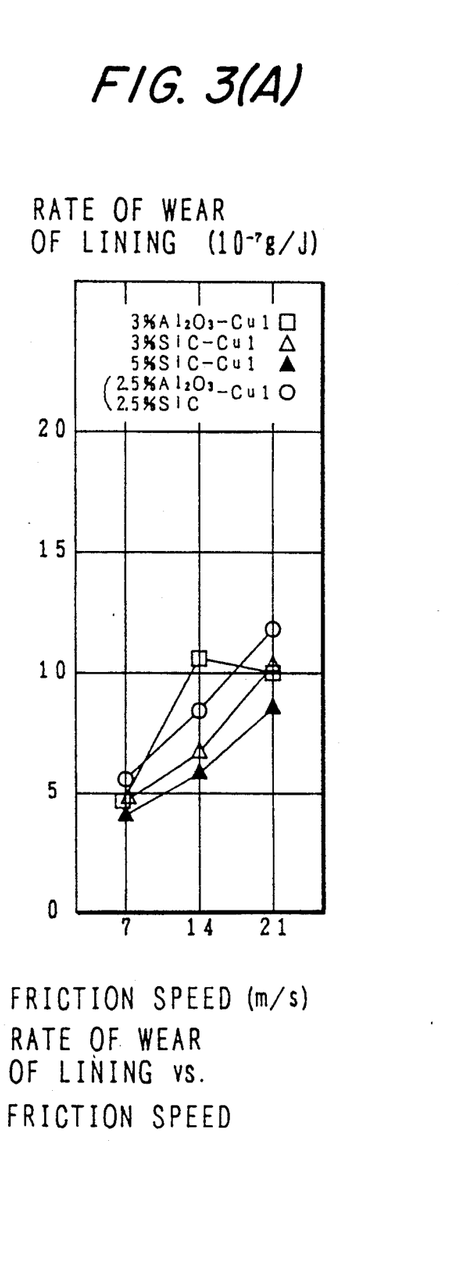
Figure 3B:
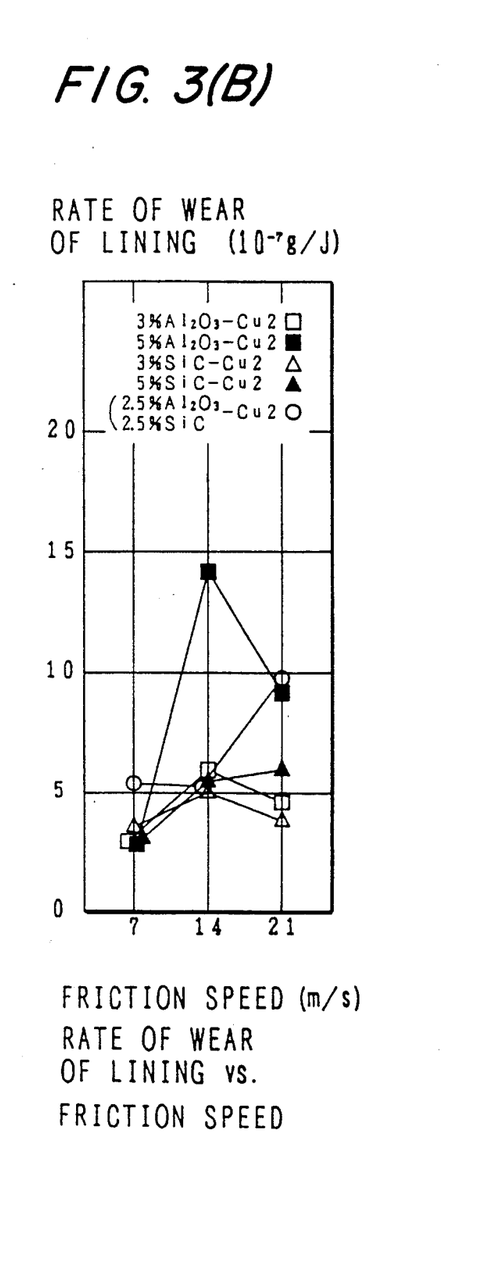
Figure 3C:
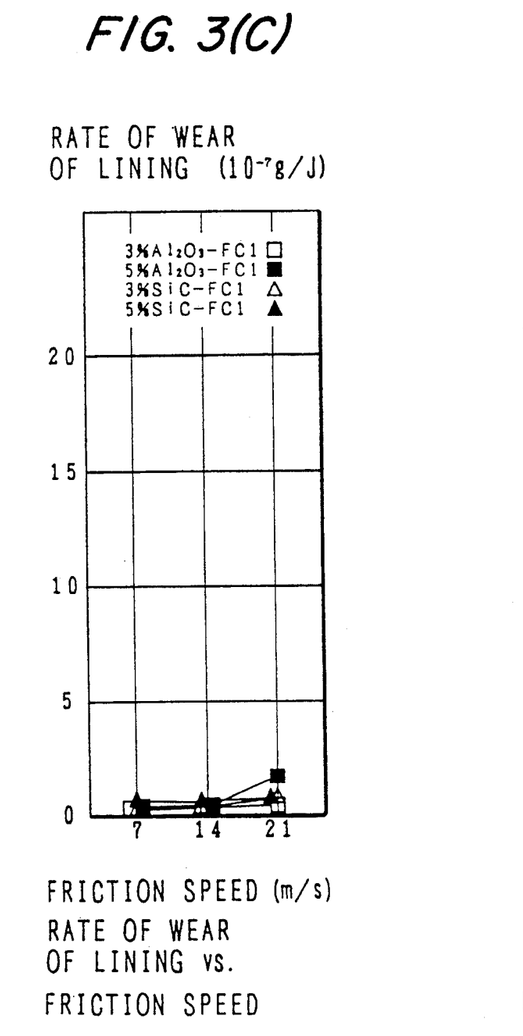
Figure 3D:
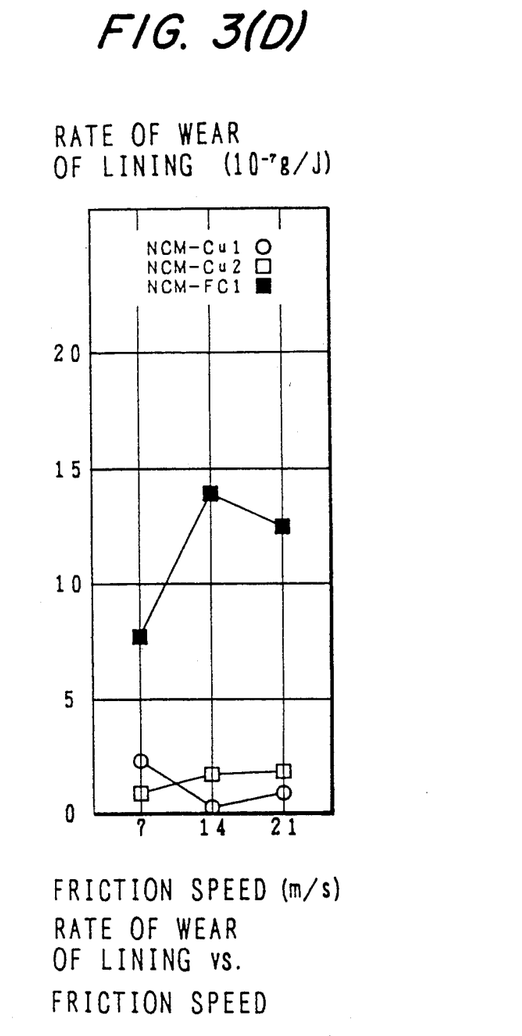

In general, the disks according to the embodiment with the addition of 5% by weight of SiC showed superior friction-wear characteristics.

Figure 4:
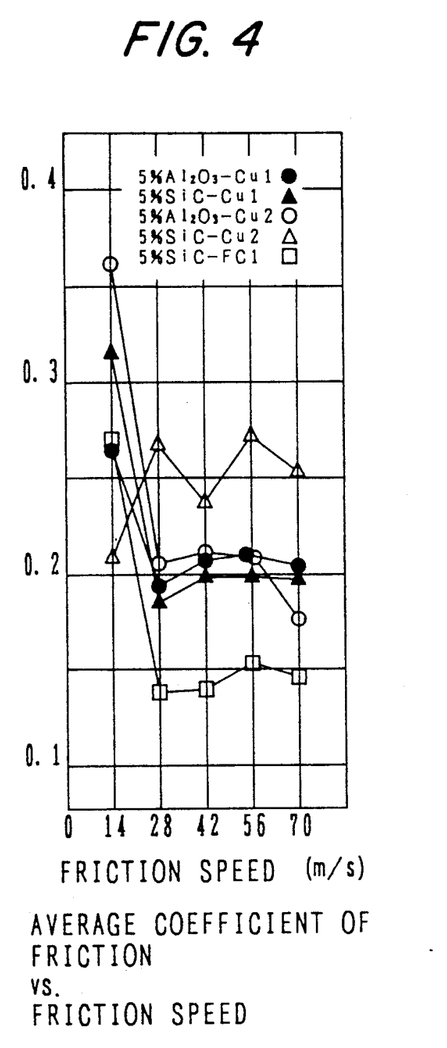
FIG. 4 shows the relationship between friction speed and average coefficient of friction.
Figure 5:
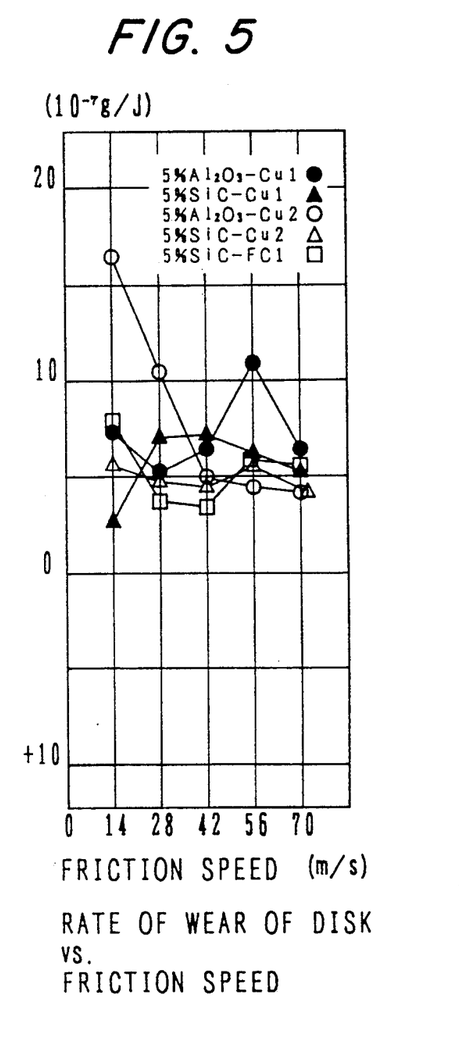
FIG. 5 shows the relationship between friction speed and rate of wear of disk.
Figure 6:
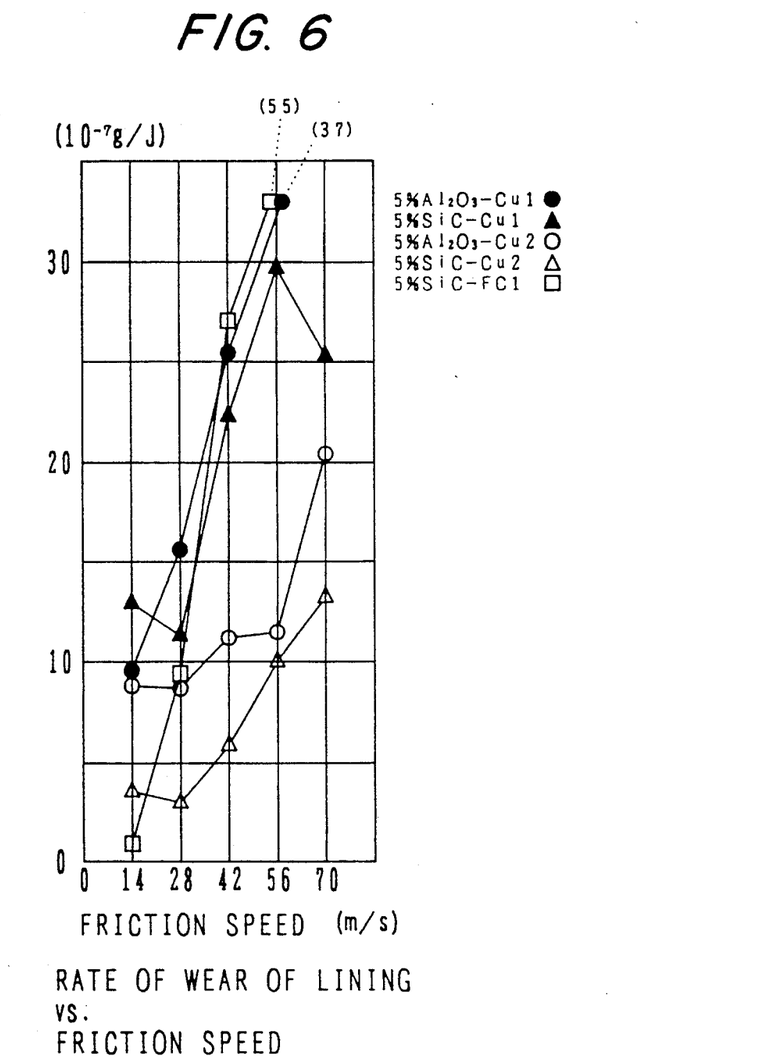
FIG. 6 shows the relationship between friction speed and rate of wear of lining.

FIGS. 4 to 6 show the results of the tests, with friction speeds of up to 70 m/s, on the material according to the embodiment (with addition of 5% by weight of SiC) which gave relatively good results upon the tests with friction speeds of up to 21 m/s. By way of comparison, the material according to the embodiment with addition of the same amount of $Al_2O_3$ was also subjected to the constant-speed friction tests.

First, a general view will be taken of the average coefficient of friction at each friction speed (FIG. 4). The combination of the material according to the embodiment with addition of 5% by weight SiC with the lining Cu2 gave a stable average coefficient of friction even in high-speed regions, without showing a sharp decrease in the average coefficient of friction with an increase in friction speed from 14 m/s to 28 m/s, which was observed with the other combinations.

Next, a general view will be taken of the rates of wear of disk and lining (FIGS. 5 and 6). The material according to the embodiment with addition of 5% by weight of SiC was little worn, even at high friction speeds, thus showing extremely high wear resistance. Also as to the rate of wear of lining, the lining Cu2 showed a substantially minimum rate of wear at each friction speed, thus giving good results, when mated with the disk with the addition of 5% by weight of SiC.

Furthermore, constant-speed friction tests with friction speeds of up to 70 m/s were carried out under the same test conditions as above except that the pressing force was changed to 0.65 MPa (the results not being shown in graphs).

The test results for the combination of the NCM cast iron as the prior art material with the lining Cu2 were compared with the test results for the combination of the material according to the embodiment with the addition of 5% by weight of SiC with the lining Cu2.

The comparison revealed that the two combinations are comparable as to average coefficient of friction. The rate of wear of disk shown by the material according to the embodiment was lower than that shown by the prior art material. As for the rate of wear of lining, the material according to the embodiment gave a value smaller, even by half, than the value given by the prior art material at a friction speed of 70 m/s.

Now, a description will be made of an embodiment of the invention in which the load on the brake disk material is increased.

Reinforcement particles of SiC were dispersed and mixed into a matrix of the 5083 aluminum alloy (JIS H4000) by a composite casting process, to obtain aluminum composite materials. The diameter of the SiC particles was about 10 to 30 $\mu$m, and the composite materials produced were of four kinds which contained the SiC particles in respective amounts of 3%, 10%, 15% and 20% by weight. The composite materials thus obtained were subjected to a constant speed type wear test to verify the friction-wear characteristics of the composite materials as brake disk materials for vehicles.

More specifically, the composite materials, as materials to be tested, were formed into disks 565 mm in diameter and 30 mm in thickness. On the other hand, a copper-base sintered alloy lining was used as a mating material for friction. The lining had a friction surface area of 30×30 mm.

The test conditions were as follows. The friction speed was 70 m/s, the pressing force for the lining was 0.5 MPa, the continuous friction time for one run was prolonged to 360 seconds, and the run was repeated 25 times, with the result of a temperature rise.

The items measured were average coefficient of friction, and rates of wear of the disk and the lining, with an observation made of the degree of scattering of the adhered particles of the disk material. The test results are shown in Table 1.

As shown in Table 1, the longer friction time with a heavier load on the disk caused seizure, in the cases of the disk materials with relatively small amounts of the ceramic particles dispersed therein, leading to a higher average coefficient of friction, heavier wear of the disk and the lining, and scattering of the adhered particles of the disk material. Where the amount of the ceramic particles dispersed was larger, on the other hand, the coefficient of friction was low and stable, and the wear of the disk and the lining was slight.

TABLE 1

Results of Constant-Speed Wear Test

| Disk material | Average coefficient of friction | Rate of wear ($10^{-7}$ g/J) Disk | Rate of wear ($10^{-7}$ g/J) Lining | Adhered particles of disk material |
|---|---|---|---|---|
| 5083 + 3 wt % SiC | 0.45 | 12.8 | 28.8 | present |
| 5083 + 10 wt % SiC | 0.31 | 8.2 | 18.9 | a little |
| 5083 + 15 wt % SiC | 0.26 | 3.6 | 12.0 | absent |
| 5083 + 20 wt % SiC | 0.23 | 3.3 | 8.3 | absent |

What is claimed is:

1. A brake disk for railroad vehicles which comprises an aluminum metal matrix consisting essentially of an Al-Mg base alloy and 1 to 25% by weight of reinforcement particles having a particle diameter of 5 to 100 $\mu$m dispersed in the aluminum metal matrix.

2. The brake disk as set forth in claim 1, wherein the amount of the reinforcement particles is in the range of 1 to 7% by weight.

3. The brake disk as set forth in claim 1, wherein the amount of the reinforcement particles is in the range of 7 to 15% by weight.

4. The brake disk as set forth in any one of claims 1 to 3, wherein the reinforcement particles are one member selected from the group consisting of alumina particles and silicon carbide particles.

5. The brake disk as set forth in any one of claims 1 to 3, wherein the reinforcement particles comprise alumina particles and silicon carbide particles.

* * * * *